(12) United States Patent
Alberola et al.

(10) Patent No.: US 9,671,244 B2
(45) Date of Patent: Jun. 6, 2017

(54) ELECTRONIC DEVICE AND METHOD FOR PROVIDING TRAVEL INFORMATION

(71) Applicant: LES SOLUTIONS CYCLELABS INC., Montreal (CA)

(72) Inventors: Gabriel Alberola, Montreal (CA); Olivier Bourbonnais, Montreal (CA); Maxime Couturier, Montreal (CA); Xavier Peich, Montreal (CA)

(*) Notice: Subject to any disclaimer, the term of this patent is extended or adjusted under 35 U.S.C. 154(b) by 0 days.

(21) Appl. No.: 14/932,094

(22) Filed: Nov. 4, 2015

(65) Prior Publication Data

US 2017/0082450 A1    Mar. 23, 2017

Related U.S. Application Data

(60) Provisional application No. 62/220,800, filed on Sep. 18, 2015.

(51) Int. Cl.
| | |
|---|---|
| *G01C 21/36* | (2006.01) |
| *B60R 1/00* | (2006.01) |
| *B60K 35/00* | (2006.01) |

(52) U.S. Cl.
CPC ............ *G01C 21/3626* (2013.01); *B60R 1/00* (2013.01); *G01C 21/3632* (2013.01);
(Continued)

(58) Field of Classification Search
CPC .. G01C 21/3626; G01C 21/3632; B60R 1/00; B60R 2300/80; B60K 35/00; B60K 2350/2008
See application file for complete search history.

(56) References Cited

U.S. PATENT DOCUMENTS 5,654,892 A * 8/1997 Fujii .................... G08G 1/0969
340/988
D391,943 S    3/1998 Han
(Continued)

FOREIGN PATENT DOCUMENTS

| CN | 203127034 U | 8/2013 |
| CN | 103640656 A | 3/2014 |

(Continued)

OTHER PUBLICATIONS

English Abstract of CN203127034 retreived on Espacenet on Nov. 3, 2015.
(Continued)

*Primary Examiner* — Michael J Zanelli
(74) *Attorney, Agent, or Firm* — BCF LLP

(57) ABSTRACT

An electronic device and a method are described, The electronic device is adapted to be installed on a handlebar of a vehicle, the electronic device comprising: a processor; a communication module; a display comprising a halo-shaped display; a memory for storing therein executable instructions, the instructions upon being processed by the processor, causing the electronic device to: receive, via the communication module, navigational data from a mobile device, the navigational data being associated with a circular visual signal indication, the circular visual signal indication being indicative of at least one of (i) an upcoming directional instruction and (ii) a distance between a current location and an upcoming location associated with the upcoming directional instruction; and, cause the display, on the halo-shaped display, of the circular visual signal indication on a portion of the halo-shaped display.

27 Claims, 9 Drawing Sheets

(52) U.S. Cl.
CPC ...... *B60K 35/00* (2013.01); *B60K 2350/2008* (2013.01); *B60R 2300/80* (2013.01)

(56) References Cited

U.S. PATENT DOCUMENTS

| | | | |
|---|---|---|---|
| 6,876,920 | B1 | 4/2005 | Mailer |
| D508,738 | S | 8/2005 | Lodato et al. |
| 7,049,944 | B2 | 5/2006 | Uno |
| 7,057,153 | B2 | 6/2006 | Linge et al. |
| D528,451 | S | 9/2006 | Cunningham et al. |
| 7,200,490 | B2 | 4/2007 | Lange et al. |
| 7,277,792 | B2 | 10/2007 | Overschie |
| 7,295,904 | B2 | 11/2007 | Kanevsky et al. |
| 7,475,594 | B2 | 1/2009 | Schultz |
| D611,366 | S | 3/2010 | Register et al. |
| 7,750,796 | B2 * | 7/2010 | Borroni-Bird ......... B60K 35/00 116/286 |
| D621,832 | S | 8/2010 | Lee et al. |
| D630,955 | S | 1/2011 | McAlpine et al. |
| D642,184 | S | 7/2011 | Brouwers et al. |
| D647,434 | S | 10/2011 | Chambers et al. |
| 8,126,645 | B2 | 2/2012 | Hsu |
| D659,564 | S | 5/2012 | Baxter |
| D661,206 | S | 6/2012 | Register et al. |
| D669,894 | S | 10/2012 | Cobbett et al. |
| D670,696 | S | 11/2012 | Cobbett et al. |
| 8,305,742 | B2 | 11/2012 | Onnela et al. |
| D673,464 | S | 1/2013 | Perko et al. |
| 8,643,722 | B2 | 2/2014 | Solida |
| D713,839 | S | 9/2014 | Endo et al. |
| 8,825,390 | B2 | 9/2014 | Chen et al. |
| D714,776 | S | 10/2014 | Kirzinger et al. |
| D717,759 | S | 11/2014 | Choi et al. |
| D726,562 | S | 4/2015 | Jeon |
| D726,677 | S | 4/2015 | Choi et al. |
| D730,198 | S | 5/2015 | Perko et al. |
| D750,510 | S | 3/2016 | Lenz et al. |
| D765,549 | S | 9/2016 | Khodapanah et al. |
| D768,124 | S | 10/2016 | Daniels et al. |
| 2008/0123322 | A1 * | 5/2008 | Tane ..................... B60K 35/00 362/23.01 |
| 2008/0234932 | A1 | 9/2008 | Lee |
| 2009/0259398 | A1 * | 10/2009 | Wang ................... G01C 21/265 701/469 |
| 2012/0078511 | A1 | 3/2012 | Lim |
| 2014/0343843 | A1 | 11/2014 | Yanku |
| 2015/0130944 | A1 | 5/2015 | Hsu |
| 2015/0193446 | A1 | 7/2015 | Barnett et al. |
| 2015/0285657 | A1 | 10/2015 | Sarvestani |
| 2015/0346921 | A1 | 12/2015 | Erad et al. |
| 2016/0221627 | A1 | 8/2016 | Hines et al. |
| 2016/0272263 | A1 | 9/2016 | Zeindl |

FOREIGN PATENT DOCUMENTS

| | | |
|---|---|---|
| DE | 19906596 A1 | 5/2000 |
| DE | 20213414 U1 | 2/2003 |
| DE | 102005004202 A1 | 8/2006 |
| KR | 101318148 B1 | 10/2013 |
| TW | M395833 U | 1/2011 |
| WO | 2014205345 A2 | 12/2014 |
| WO | 2016128586 A1 | 8/2016 |

OTHER PUBLICATIONS

English Abstract of DE20213414 retreived on Espacenet on Nov. 3, 2015.
English Abstract of CN103640656 retreived on Espacenet on Nov. 3, 2015.
English Abstract of KR101318148 retreived on Espacenet on Nov. 3, 2015.
English Abstract of DE19906596 retreived on Espacenet on Nov. 3, 2015.
VICE retrieved from http://www.damonahola.com/vice-smart-bike-system/ on Nov. 3, 2015.
Baidu DuBike retrieved from http://dubike.baidu.com/web-en.html on Nov. 3, 2015.
Vanhawks Valour retrieved from https://www.vanhawks.com/ on Nov. 3, 2015.
Helios retrieved from http://www.ridehelios.com/ on Nov. 3, 2015.
Cookee retrieved from http://kicktrend.com/2015/08/06/cookee-smart-bike-for-the-young/ on Nov. 3, 2015.
BiCi retrieved from http://www.pozible.com/project/188953 on Nov. 3, 2015.
Wahoo ELEMNT retrieved from http://www.wahoofitness.com/gps-bike-computer-elemnt.html on Nov. 3, 2015.
HAIKU retrieved from http://www.haiku.bike/ on Nov. 3, 2015.
Canyon retrieved from http://www.bikeradar.com/news/article/canyons-smart-bike-computer-is-a-world-first-45123/ on Nov. 3, 2015.
English Translation of DE102005004202 retrieved from the internet (Orbit Intelligence site) on Dec. 22, 2016.
"Beeline navigation system could revolutionize how we cycle in cities (video)", Stuart Clarke, Aug. 12, 2015, retrieved from the internet: http://www.cyclingweekly.co.uk/news/product-news/beeline-navigation-system-could-revolutionise-how-we-cycle-in-cities-video-186828.
International Search Report and Written Opinion with regard to the counterpart application PCT/IB2016/055555 mailed on Dec. 22, 2016.
Official Action issued by the CIPO with regard to the Canadian Patent Application 2,911,003 (mailed on Jan. 31, 2017).

* cited by examiner

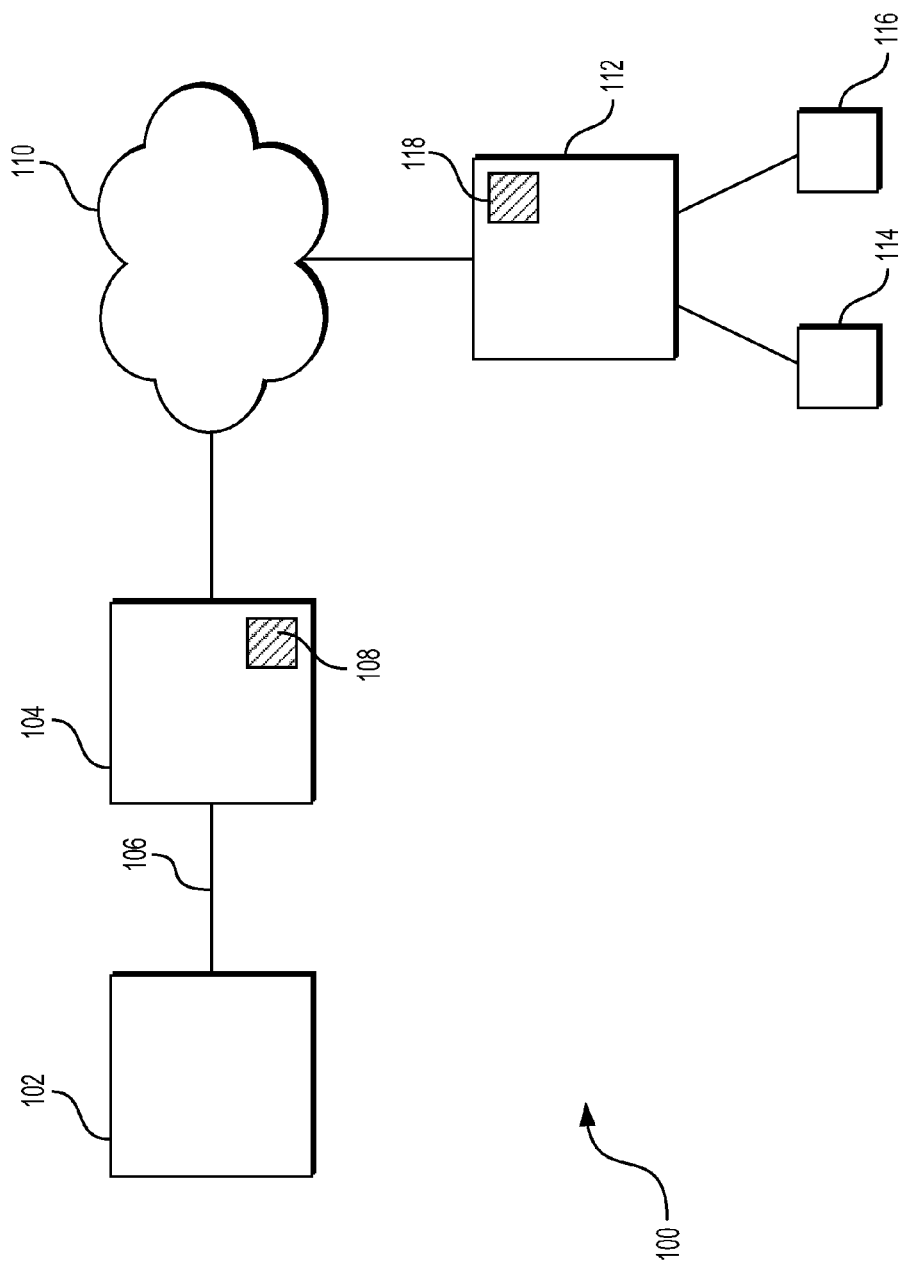

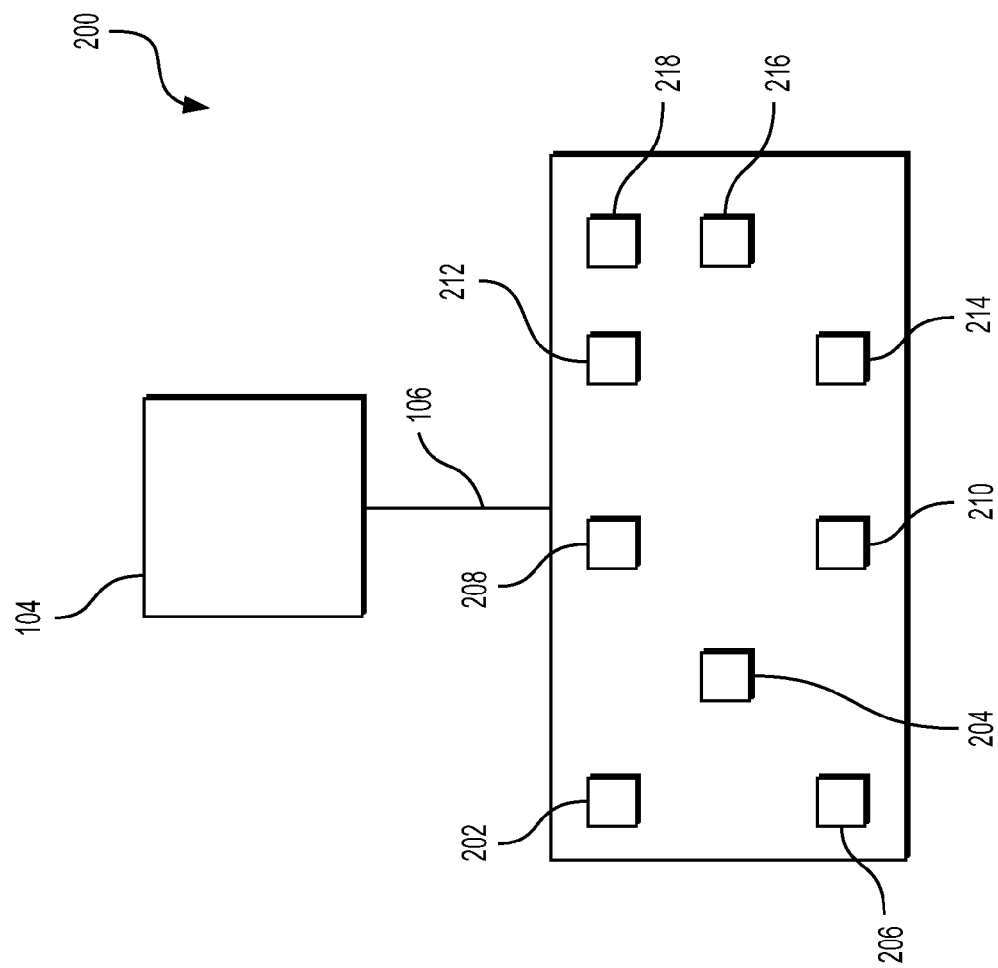

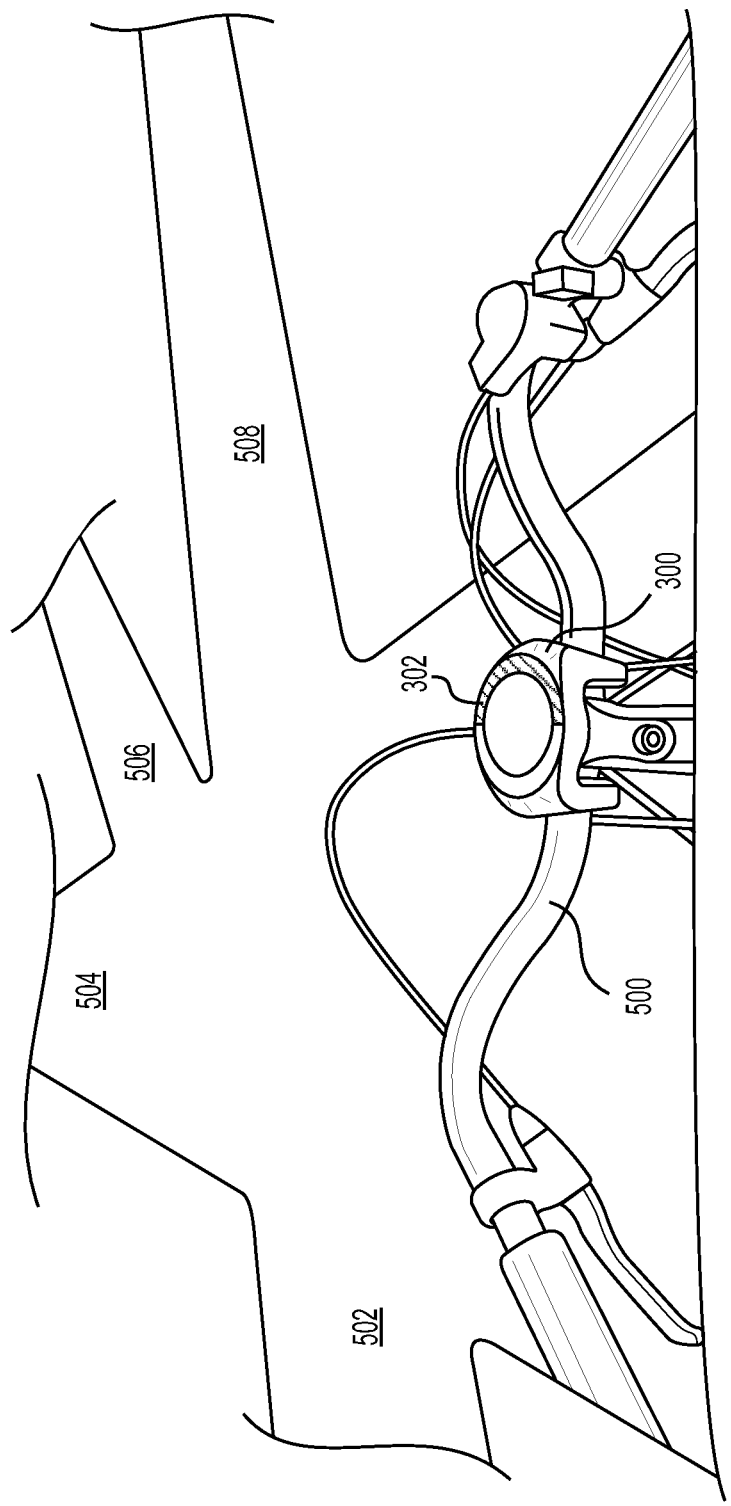

ELECTRONIC DEVICE AND METHOD FOR PROVIDING TRAVEL INFORMATION

CROSS-REFERENCE TO RELATED APPLICATIONS

The present technology is related to and claims the benefit of U.S. Provisional Application No. 62/220,800 filed on Sep. 18, 2015.

FIELD OF THE INVENTION

The present technology relates to the field of navigation systems. More precisely, the present technology discloses an electronic device and method for providing travel information on a handlebar of a vehicle, such as, but not limited to, a bicycle, a motorcycle, an all-terrain-vehicle, and the like.

BACKGROUND

With the growth of eco-friendly trend in the means of transportation, the use of low fuel consumption vehicle, such as a motorcycle, or non-fuelled vehicle, such as a bicycle, as a mean of travelling between two points have increased in recent years. This trend can be noticed even more in large urban cities where the use of the bicycle as a transportation mean has grown largely to the lack of parking spaces, and growth of bicycle sharing systems such as Bixi™.

Moreover, with the advance in technology, it is easier for drivers to access their devices, such as smartphones, to verify their trajectory when travelling. Needless to say, the use of the hands being crucial in directing the single-track vehicle, one must stop whenever desiring to interact with the smartphone to, for example, verify the trajectory.

US2012/0078511 ("Lim") discloses a method and apparatus to enhance the direction navigation capabilities of GPS-enabled devices, through the use of light indicators. The light indicators are positioned the top, bottom, and sides of the GPS screen. The lights blink at different rates relatively to a distance to a destination. The light indicators show various effects to indicate various instructions, such as to go forward direction, to go onto an overhead bridge, to enter into an underground tunnel (abstract).

US2014/0343843 ("Yanku") discloses a portable navigation prompt device comprising a processor, a wireless communication module, a discrete light source arrangement; and a memory having stored therein executable instructions configured to cause the portable navigation prompt device to establish wireless communication with a master navigation device configured to generate route navigation events based on progress along a navigable route. The executable instructions are further configured to cause the portable navigation prompt device to receive information representing a route navigation event from the master navigation device, wherein the route navigation event is selected from a plurality of available route navigation events; and output a route navigation prompt that corresponds to the first route navigation event, wherein the route navigation prompt comprises a first illumination of the discrete light source arrangement that distinguishes the route navigation event from other available route navigation events. The discrete light source arrangement may comprise, for example, a plurality of light emitting diodes (LEDs). The manner in which the discrete light source arrangement is implemented is depicted within FIGS. 3A to 4C of Yanku's disclosure, where both a linear and two-dimensional discrete light source array are used to provide navigational instructions.

SUMMARY

It is an object of the present technology to ameliorate at least some of the inconveniences present in the prior art.

Inventors have developed embodiments of the present technology based on their appreciation of at least one problem associated with the prior art. For example, even though the prior art solution presented with reference to Lim and Yanku, have merits and assists with presenting visual navigational instructions to the user, it still presents certain shortcomings. For example, in Lim, the four sides of an apparatus each provide the respective directions by illumination. In Yanku, small illuminations formed in a diamond (or in a line) provide directions by illumination. Even though the technology of Yanku provides directions by illuminating certain LEDs of the "discrete light source array" arrangement, the geometry of the arrangement may present certain limits in effectively communicating instructions, in particular visual signal indication, to the user operating the handlebar. These limits are even more prevalent when visual signal indications are to be provided to a user of a vehicle such as a bicycle, since, for security reasons, the amount of time and/or visual attention the user may dedicate to properly recognize and interpret the visual signal indication must be as quick as possible. These limits may also be prevalent when a plurality of indications are to be communicated to the user, in particular, indications allowing a more refined understanding of navigational instructions. This is more prevalent in urban context, where the user may need, for example, to differentiate between various types of turns, such as a sharp turn, a turn, and a light turn and their respective distance to each of said instructions In addition, improvements as to how the visual signal indication are generated before being presented to the user may also be desirable, in particular to limit an amount of processing power required from the electronic device required to generate such visual signal indication, thereby saving battery consumption on the electronic device.

Therefore, improvements as to how the visual signal indications are to be presented to indicate a plurality of instructions to a user effectively, without requiring a constant attention, and/or how the visual signal indications are generated may be desirable.

According to a first broad aspect of the present technology, there is provided an electronic device, the electronic device being adapted to be installed on a handlebar of a vehicle, the electronic device comprising; a processor; a communication module; a display comprising a halo-shaped display; a memory for storing therein executable instructions, the instructions upon being processed by the processor, to cause the electronic device to: receive, via the communication module, navigational data from a mobile device, the navigational data being associated with a circular visual signal indication, the circular visual signal indication being indicative of at least one of (i) an upcoming directional instruction and (ii) a distance between a current location and an upcoming location associated with the upcoming directional instruction; and, cause the display, on the halo-shaped display, of the circular visual signal indication on a portion of the halo-shaped display.

In some embodiments of the electronic device, the navigational data is being associated with the circular visual signal indication on the mobile device using a correspondence table implemented in the mobile device.

In some embodiments of the electronic device, the navigational data is being associated with the circular visual signal indication on the electronic device using a correspondence table implemented in the electronic device.

In some embodiments of the electronic device, the display comprises a plurality of LEDs arranged in a circular fashion.

In some embodiments of the electronic device, the causing the display, on the halo-shaped display, of the circular visual signal indication comprises determining which LED amongst the plurality of LEDs is to be illuminated to define the circular visual signal indication.

In some embodiments of the electronic device, the causing the display, on the halo-shaped display, of the circular visual signal indication comprises determining which color is to be emitted by at least some of the plurality of LEDs.

In some embodiments of the electronic device, the circular visual signal indication comprises at least one of a sharp right-turn display, a light right-turn display, a right-turn display, a sharp left-turn display, a light left-turn display, a left-turn display, a keep-straight display, a U-turn display, and an arrive-at-destination display.

In some embodiments of the electronic device, the electronic device further comprises a circular display.

In some embodiments of the electronic device, the circular visual signal indication comprises a special event display.

In some embodiments of the electronic device, the display, on the halo-shaped display, of the circular visual signal indication comprises illuminating a first circular portion of the display with a first color and illuminating a second portion of the display with a second color.

In some embodiments of the electronic device, upon determining that the current location of the mobile device has changed, modifying at least a portion of the first circular portion so as to replace the first color with the second color.

In some embodiments of the electronic device, upon determining that the current location of the mobile device has changed, modifying the first circular portion from the first color so as to replace the first color with the second color.

In some embodiments of the electronic device, upon determining that the current location of the mobile device has changed, causing the second portion to define a second circular portion and a third circular portion, the first circular portion being located between the second circular portion and the third circular portion.

In some embodiments of the electronic device, upon determining that the current location of the mobile device has changed, causing the first circular portion to be reduced and causing the second and third circular portions to be expanded.

In some embodiments of the electronic device, upon determining that the current location of the mobile device has changed, causing at least one of the first circular portion and the second portion to flash.

In some embodiments of the electronic device, the navigational data are generated by the mobile device based on a GPS location determined by the mobile device.

In some embodiments of the electronic device, the navigational data are generated by the mobile device based on data received by the mobile device.

In some embodiments of the electronic device, the navigational data comprises a first byte associated with general instruction and a second byte associated with a parameter of the general instruction.

In some embodiments of the electronic device, the circular visual signal indication comprises a direction of a destination display, allowing displaying a direction in which the destination is located with respect to the user without providing specific directional indications to get to the destination.

According to another broad aspect of the present technology there is provided a method of displaying navigational instructions, the method being executable by an electronic device, the electronic device being adapted to be installed on a handlebar of a vehicle and comprising a display, the display comprising a halo-shaped display, the method comprising: receiving, via a communication module, navigational data from a mobile device, the navigational data being associated with a circular visual signal indication, the circular visual signal indication being indicative of at least one of (i) an upcoming directional instruction and (ii) a distance between a current location and an upcoming location associated with the upcoming directional instruction; and causing the display, on the halo-shaped display, the circular visual signal indication on a portion of the halo-shaped display.

In some embodiments of the method, the navigational data is being associated with the circular visual signal indication on the mobile device using a correspondence table implemented in the mobile device.

In some embodiments of the method, the navigational data is being associated with the circular visual signal indication on the electronic device using a correspondence table implemented in the electronic device.

In some embodiments of the method, causing the display, on the halo-shaped display, of the circular visual signal indication comprises determining which LED amongst the plurality of LEDs is to be illuminated to define the circular visual signal indication.

In some embodiments of the method, causing the display, on the halo-shaped display, of the circular visual signal indication comprises determining which color is to be emitted by at least some of the plurality of LEDs.

In some embodiments of the method, the circular visual signal indication comprises at least one of a sharp right-turn display, a light right-turn display, a right-turn display, a sharp left-turn display, a light left-turn display, a left-turn display, a keep-straight display, a U-turn display, and an arrive-at-destination display.

In some embodiments of the method, causing the display, on the halo-shaped display, of the circular visual signal indication comprises illuminating a first circular portion of the display with a first color and illuminating a second portion of the display with a second color.

In some embodiments of the method, upon determining that the current location of the mobile device has changed, modifying at least a portion of the first circular portion so as to replace the first color with the second color.

In some embodiments of the method, upon determining that the current location of the mobile device has changed, modifying the first circular portion so as to replace the first color with the second color.

In some embodiments of the method, upon determining that the current location of the mobile device has changed, causing the second portion to define a second circular portion and a third circular portion, the first circular portion being located between the second circular portion and the third circular portion.

In some embodiments of the method, upon determining that the current location of the mobile device has changed, causing the first circular portion to be reduced and causing the second and third circular portions to be expanded.

In some embodiments of the method, upon determining that the current location of the mobile device has changed, causing at least one of the first circular portion and the second portion to flash.

In some embodiments of the method, the navigational data are generated by the mobile device based on a GPS location determined by the mobile device.

In some embodiments of the method, the navigational data are generated by the mobile device based on data received by the mobile device.

In some embodiments of the method, the navigational data comprises a first byte associated with general instruction and a second byte associated with a parameter of the general instruction.

In some embodiments of the method, the circular visual signal indication comprises a direction of a destination display, allowing displaying a direction in which the destination is located with respect to the user without providing specific directional indications to get to the destination.

In a third broad aspect of the present technology, there is provided a method of transmitting navigational data, the method comprising: receiving data, over a communication network, generating navigational data based on the data, navigational data being associated with circular visual signal indication indicative of at least one of (i) an upcoming directional instruction, and (ii) a distance between a current location and an upcoming location associated with the upcoming directional instruction; and transmitting, to an electronic device, navigational data for display on a halo-shaped display.

In some embodiments of the method, the navigational data is generated by the mobile device based on a GPS location determined by the mobile device.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is a schematic diagram of a system suitable for implementing non-limiting embodiments of the present technology.

FIG. 2 is a block diagram of an exemplary architecture of the electronic device.

FIG. 5 is a perspective view of the electronic device assembled on a handlebar.

DETAILED DESCRIPTION OF THE DRAWING

Figure 3A:
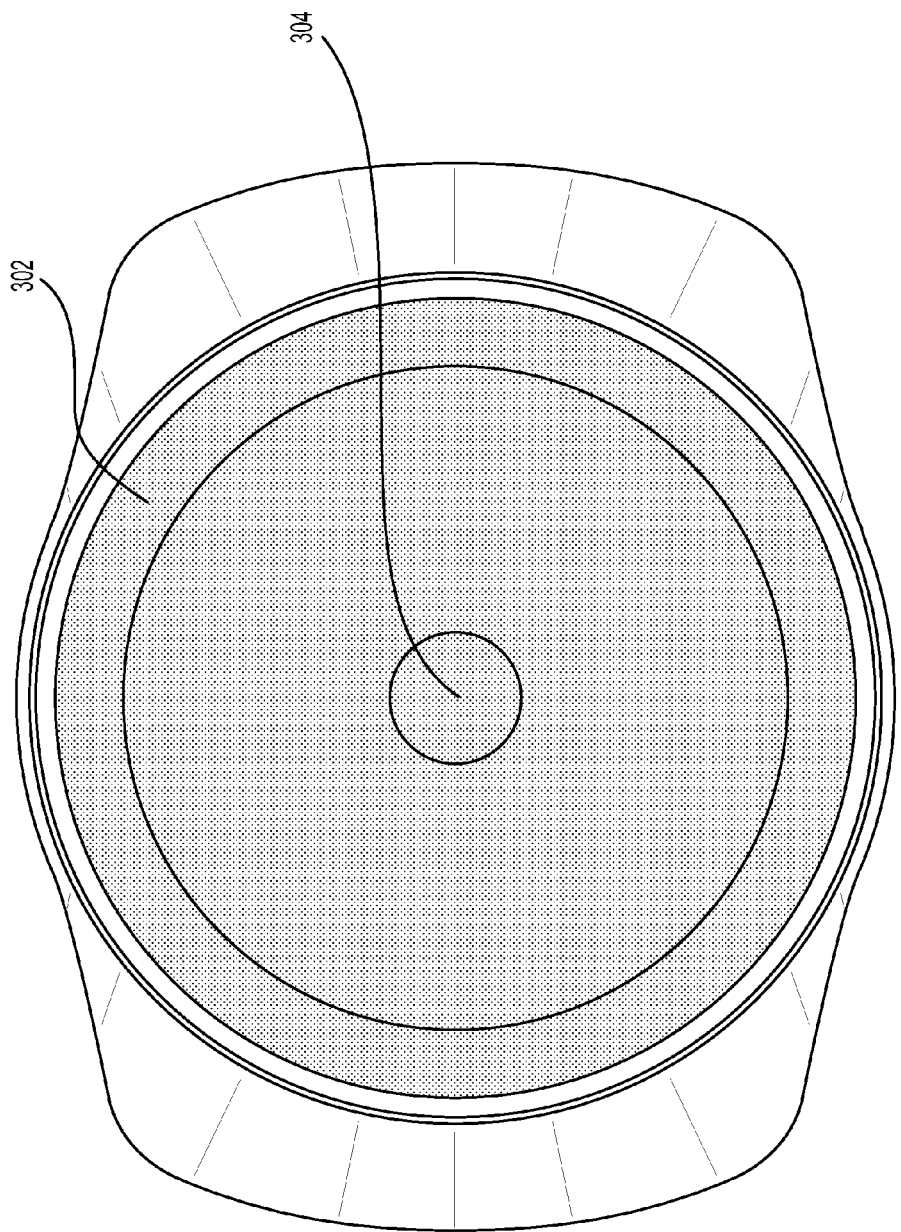
FIG. 3A is an exemplary illustration of a frontal assembled view of the electronic device's display.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus the description thereof that follows is indented to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding and, again, not to define the scope or set forth the bounds of the presented technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of greater complexity.

The system 100 comprises an electronic device 102. As it will be described in more detail below, suffice to say for now that the electronic device 102 is an apparatus designed to be installed on a handlebar of a vehicle, such as, but not limited to, a bicycle. Even though reference is made to a handlebar, it should be understood that the electronic device 102 may be installed on other parts of the vehicle, such as a frame of the vehicle.

The electronic device is coupled to a mobile device 104 via a communication link 106. The mobile device 104 is typically associated with a user (not depicted) and, as such, can sometimes be referred to as a "client device". It should be noted that the fact that the mobile device 104 is associated with the user does not mean to suggest or imply any mode of operation—such as a need to log in, a need to be registered or the like.

How the communication link 106 is implemented is not particularly limited and will depend on how the electronic device 102 is implemented. Merely as an example and not as a limitation, in those embodiments of the present technology where the electronic device 102 is implemented as a wireless communication device, the communication link 106 can be implemented as a wireless communication link such as but not limited to Bluetooth®.

It should be expressly understood that implementations for the electronic device 102 and the communication link 106 are provided for illustration purposes only. As such, those skilled in the art will easily appreciate other specific implementational details for the electronic device 102. As such, by no means examples provided herein above are meant to limit the scope of the present technology.

The implementation of the mobile device 104 is not particularly limited, but as an example, the mobile device 104 may be implemented as a smartphone with a GPS and navigation functionality. Suffice it to say that the mobile device 104 comprises a user input interface (such as a touch pad, touch screen, and the like) for receiving user inputs; a user output interface (such as a screen, a touch screen, and the like) for providing visual outputs to the user, a network communication interface for two-ways communication over a communication network 110 (described below); and a processor coupled to the user input interface, the user output interface, and the network communication interface, the processor being configured to execute various routines, including those described herein below.

The mobile device 104 comprises hardware and/or software and/or firmware (or a combination thereof), as is known in the art, to execute a mobile application 108. Generally speaking, the mobile application 108 is a computer program designed to run on the mobile device 104. As it will be described in more precision below, suffice to say for now that the mobile application 108 may or may not have been previously downloaded and/or installed on the mobile device 104. In some non-limiting embodiments, the mobile application 108 is a proprietary mobile application provided by Les Solutions CycleLabs Inc.

In some non-limiting embodiments, the mobile application 108 is a route planning application designed to plan a route between two geographical points. The manner in which the route planning application is implemented is well known to a person skilled in the art will not be described at much length herein. Suffice to say that the mobile application 108 running on the mobile device 104 is configured to receive inputs from the user (not depicted) operating the mobile device 104, the input being indicative of the geographical locations (i.e. starting point and destination point). The mobile application 108 then accesses a server 112 (described below) to retrieve a plurality of proposed route. In some embodiments, the mobile device 104 comprises a GPS module (not depicted) which generates data indicative of the geolocation of the mobile device 104. As such, the GPS module (not depicted) may give the user the choice of selecting the current location of the mobile device 104 as the starting point of the route. Upon approval, or selection of the proposed route by the user, the mobile application 108 instantiate the selected trajectory route.

In some non-limiting embodiment, the mobile application 108 may allow the user to set objective parameters, such as the target calories to be burned, duration of the navigation, distance of the navigation or the like.

The mobile device 104 is also coupled to a communication network 110 via a dedicated link (not depicted). How the dedicated link is implemented is not limited, and may be implemented in a similar manner to the communication link 106. In some non-limiting embodiments of the present technology, the communication network 110 can be implemented as the internet. In other embodiments of the present technology, the communication network 110 can be implemented differently, such as any wide-area communication network, local-area communication network, a private communication network and the like.

Also coupled to the communication network 110 is a server 112. In some embodiments of the present technology, the server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers (not depicted).

The implementation of the server 112 is well known. However, briefly speaking, the server 112 comprises a communication interface (not depicted) structured and configured to communicate with various entities (such as the electronic device 104, for example, and other devices potentially coupled to the communication network 110) via the communication network 110. The server 112 further comprises at least one computer processor (not depicted) operationally connected with the communication interface and structured and configured to execute various processes to be described herein.

Within some embodiments, the server 112 is configured to host a first web service 114 and a second web service 116. Generally speaking, the first web service 114 and second web service 116 are services geared towards addressing one or more of a user's needs or problems. For example, a map service, being an example of the first web service 114, is geared toward solving a user problem of determining a particular route from Point A to Point B. In some non-limiting embodiments of the present technology, the mobile device 104 may request a route from the first web service 114 by inputting the starting point and the destination point in the mobile application 108 running on the mobile device 104. In another example, the second web service 116 is a meteorological service, and is geared to providing the user with meteorological data to the mobile device 104 via the mobile application 108, the data being indicative of meteorological data of the area around, but not limited to, the current position of the mobile device 104.

In some embodiments, the server 112 may comprise an API library 118 which provides a library of API functions provided by the first web service 114 and second web service 116. For example, provided that the first web service 114 corresponds to a mapping service, such as but not limited to, Google Maps™, the mobile device 104 can access the API library 118 via the mobile application 108 to retrieve the Google Maps™ API and process the optimal route for the inputted points within the electronic device 104 via the mobile application 108. In another embodiment, the mobile device 104 may be configured to store a map service (via a mobile application), therefore allowing the mobile application 108 to process a route without accessing the first web service 114. In a further example, provided that the second web service 116 corresponds to a meteorological service, such as but not limited to, AccuWeather™, the mobile device 104 can access the API library 118 via the mobile application 108 to retrieve AccuWeather™ API and receive meteorological data around the position of the mobile device 104 via the mobile application 108. In another embodiment, the mobile device 104 may be configured to store a meteorological service (via a mobile application), therefore allowing the mobile application 108 to receive meteorological data around the position of the mobile device 104 without accessing the second web service 116.

FIG. 2 is a block diagram of an exemplary architecture 200 of the electronic device 102. The electronic device 102 comprises a communication module 202 configured for communication with the mobile device 104. In some embodiments, the communication module 202 receives a navigational data (described below) from the mobile device 104, the navigational data being associated with a circular visual signal indication.

Generally speaking, in order for the electronic device 102 to successively establish a communication link 106, such as, but not limited to Bluetooth® (also known as "pairing"), between the mobile device 104 and the electronic device 102, the electronic device 102 must be registered with the mobile device 104. The manner in which the registration is made is not limited and will not be described as much. As such, just as an example, a unique serial number of the electronic device 102 could be used as a registration key which is to be inputted in the mobile device 104 via the mobile application 108. In a further embodiment, the pairing can be established without the need of registration, by using a near field communication (NFC), or using a QR Code which can be captured using the camera of the mobile device 104 via the electronic device 102.

Generally speaking once the registration is over, a movement of the electronic device 102 is detected by the accelerometer 216 (described below) triggers the communication module 202 to automatically pair with the nearby registered mobile device 104. Conversely, and generally speaking, whenever the mobile device 104 moves apart from the electronic device 102 up to a certain distance, the communication link 106 is lost. In some non-limiting embodiments of the present technology, upon losing the communication link 106, the mobile application 108 may cause the memory (not depicted) of the mobile device 104 to store the location. By storing the last location of the paired session, the mobile device 104 allows the user to locate his or her parked vehicle.

In yet another non-limiting embodiment, the mobile application may store within the memory (not depicted) of the mobile device 104, data indicative of each paired sessions between the registered mobile device 104 and the electronic device 102. For example, the memory (not depicted) of the mobile device 104 may store information about the previous routes' starting points and finish points, such as the average speed of the vehicle for the plurality of paired sessions, the total distance, the total calories burned, etc. In a further embodiment, the data stored in the memory of the mobile device 104 may be accessed by the user operating the mobile application 108 to view his or her progress or share it on a social web platform (such as Facebook™).

The processor 204 is responsible for the overall functioning of the electronic device 102 and executes program code. The program code can include code for interpreting and responding to navigational data received from the mobile device 104, user input received from the user input module 206 (described below), and the like.

In some embodiments, the program code can be stored in a memory 208 and/or in some other location, such as in the storage located in the processor 204 itself. The manner in which the memory 208 is implemented is not limited, and can be any suitable memory, such as programmable read-only memory (PROM) or flash memory. Generally speaking, the program code processed by the processor 204 can be pre-loaded into the memory 208 and is generally not configurable by a user, but it is not limited as such, and the user may add or configure the program code into the memory 208.

The electronic device 102 also comprises a display 210. The manner in which the display 210 is implemented is not limited, and may comprise of a plurality of multi-colored LEDs arranged in a halo-shaped display and a circular display (described in more detail under FIG. 3). In some non-limiting embodiments, the display 210 may comprise a set of individually controllable LEDs.

As it will be discussed in more detail below, the various characteristics of the illumination of the display 210 can be used independently or in combination to signal the user in ways that distinguish navigation instructions from one another. Suffice to say for now that in response to receiving navigational data from the mobile device 104, the processor causes the display 210 to display a circular visual signal indication on a portion of the display 210. In some non-limiting embodiments, the circular visual signal indication is indicative of (i) an upcoming directional instruction; and/or (ii) a distance between a current location and an upcoming location, associated with the upcoming directional instruction.

In some embodiments, the navigational data are generated by the mobile device 104 based on the GPS location determined by the mobile device. In alternative embodiments, the navigational data are generated by the mobile device 104 based on data received by the mobile device 104 over the communication network 110.

The manner in which the navigational data is associated with the circular visual signal indications is not limited. In a non-limiting embodiment, the navigational data is associated with the circular visual signal indications on the mobile device 104. Alternatively, the navigational data may be associated with the circular visual indications on the electronic device 102.

For example, in the former situation the mobile device 104 may receive, via the API of the first web service 114, data indicative of route instructions. The mobile device 104 may then generate navigational data based on the data via the mobile application 108, by associating the data with circular visual signal indications using a correspondence table implemented by the mobile application 108. Once the navigational data is generated, the mobile device 104 transmits to the electronic device 102, the navigational data for display on the display 210. In an alternative embodiment, the data received from the API of the first web service 114 may be transmitted directly to the electronic device 102 by the mobile device 104 and the generating of the navigational data by associating of the navigational data with the circular visual signal indications may occur within the electronic device 102 using a correspondence table implemented within the memory 208. In such an embodiment the data may also be referred to navigational data. Once transmitted to the electronic device 102 by the mobile device 104, the navigational data is then processed by the electronic device 102 so as to be associated with corresponding circular visual signal indications using a correspondence table implemented by the electronic device 102. The manner in which the correspondence table is implemented is not limited, and suffices to say that the correspondence table is configured to transform a first type of signal into a predetermined second type of signal. For example, if the first type of signal is a "90 degree turn", the first type of signal may be transformed into a second type of signal "illuminate the right portion" of the halo-shaped display 210, using the correspondence table.

In some embodiments, the navigational data transmitted to the electronic device 102 from the mobile device 104 is done by bytes sending, each byte being an Unsigned Int 8 bit. As such, the first byte corresponds to a general instruction that the mobile device 104 is sending to the electronic device 102, such as navigation instructions, sound instructions, etc. as illustrated in the following table:

| Digit | General instruction type |
|---|---|
| 0 | End of communication (ending byte) |
| 1 | Navigation instruction |
| | 2 parameters |
| | 1: type of turn |
| | 2: step of animation |
| 2 | Front LED (turn it on with specified brightness) |
| | 1 parameter |
| 3 | Call notification |
| | 1 parameter |
| 4 | Sound |
| 5 | Brightness |

| Digit | General instruction type |
|---|---|
| | 1 parameter |
| 6 | Front LED brightness |
| 7 | Goal completion |
| | 1 parameter |
| 8 | Initial pairing |
| 9 | Animation for an update notification |

Depending on the parameters required for each instruction, the mobile device 104 transmits a corresponding number of bytes corresponding to the parameters. For example, in the case of a navigational instruction, the mobile device 104 sends further two bytes, each corresponding to the type of turns, and the step of animation.

Needless to say, the manner in which the navigational data are transmitted for display is not limited to the above-mentioned manner, and as a person skilled in the art would understand, different manners may be implemented.

In some embodiments, the electronic device 102 further comprises a front light 212. In some embodiments, the user of the mobile device 104 may instruct the front light 212 to be illuminated by interacting with the mobile application 108. As briefly mentioned previously, the mobile device 104 may access an API library 118 which provides API of a meteorological web service (second web service 116 in the example above) to retrieve meteorological data near the location of the mobile device 104. In some embodiments, the mobile device 104 may retrieve meteorological data to determine, by the mobile application 108, whether to illuminate the front light 212 for optimal navigational experience.

For example, if the retrieved meteorological data provides that the sunset around the location of the mobile device 104 is to occur at 6:34 PM, the mobile device 104 may compare the time with its embedded clock (not depicted) and instruct the electronic device 102 to illuminate the front light 212 of the currently active electronic device 102 once the embedded clock counts 6:34 PM. Alternatively, if the meteorological data provides that the sunrise around the location of the mobile device 104 is to occur at 6:34 AM, the mobile device 104 may compare the time with its embedded clock and instruct the electronic device 102 to turn off the front light 212 of the currently active electronic device 102 once the embedded clock counts 6:34 AM.

In another example, if the retrieved meteorological data provides that the current location of the mobile device 104 is after sunset, the mobile device 104 may instruct the electronic device 102 to turn on the front light 212 automatically.

It is to be expressly understood that the present technology is not limited to illuminating the front light 212 based on the meteorological data indicative of the sunset and/or sunrise. Indeed, the front light 212 may be illuminated based on a plurality of meteorological factors that may affect optimal navigational experience of the user operating the vehicle, such as, but not limited to, rain, fog, and the like.

In a further embodiment, the front light 212 may be continuously illuminated, or illuminate in a blinking manner.

In a further embodiment, the meteorological data may also be used to adjust the intensity of the illuminated circular visual signal indications on the display 210. For example, if it is determined that the user is riding the bicycle at night, the mobile device 104 may transmit instructions to lower the intensity of the illumination for each circular visual signal indications to prevent the user from being blinded by the illumination.

In another embodiment, the electronic device 102 further comprises an audio module 214. The audio module 214 may be configured to provide audio instructions with the circular visual signal indications.

In some embodiments, the electronic device 102 further comprises a user input module 206 to receive user input. As it will be described below, the interaction of the user input module 206 prompts the processor 204 to switch a first display type to a second display type.

In some embodiments, the electronic device 102 further comprises an accelerometer 216. Generally speaking, an accelerometer 216 is a device that measures the proper acceleration of the electronic device 102. In some embodiments, the electronic device 102 does not comprise an "on/off" button. In this case, the detection of a movement indicative of navigation by the accelerometer 216, triggers the electronic device 102 to be activated. The activation may allow the pairing of the electronic device 102 with the closely located registered mobile device 104. Alternatively, the lack of movement of the vehicle and the loss of connection between the electronic device 102 and the mobile device 104 due to a large distance between them causes the electronic device 102 to be deactivated.

In some embodiments, the detection of a movement indicative of navigation by the accelerometer 216 of the unpaired electronic device 102 triggers the audio module 214 to emit an alarm sound. The alarm sound can be deactivated by inputting a "tapcode" via the user-input module 206, or by linking (i.e. pairing) the electronic device 102 with the registered mobile device 104.

In some embodiments, the electronic device 102 may further comprise a power source 218. The manner in which the power source 218 is implemented is not limited, and as such may be a battery implemented to allow inductive charging (i.e. wireless charging).

FIG. 3A is an exemplary illustration of a frontal assembled view of the display 210 of the electronic device 102. As briefly described above, the display 210 comprises a plurality of multi-color LEDs arranged in a halo-shaped display 302, and a circular display 304 positioned within the halo-shaped display 302.

In the context of the present specification, unless provided expressly otherwise, "halo-shaped display" may refer to any geometric display that is presentable on the electronic device 102 using any hollow geometric shapes to allow, in some embodiments, a secondary display (such as the circular display 304) to be placed within the inner space of the halo-shaped display 302. Thus, although depicted as a symmetrical halo as a preferred embodiment, those skilled in the art would understand that the halo-shaped display could be implemented in an asymmetrical manner, such as an oval, as a n-sided geometric shape (e.g., polygon), or a open curve geometric shape. In some embodiments, the halo-shaped display is a planar display.

Figure 3B:
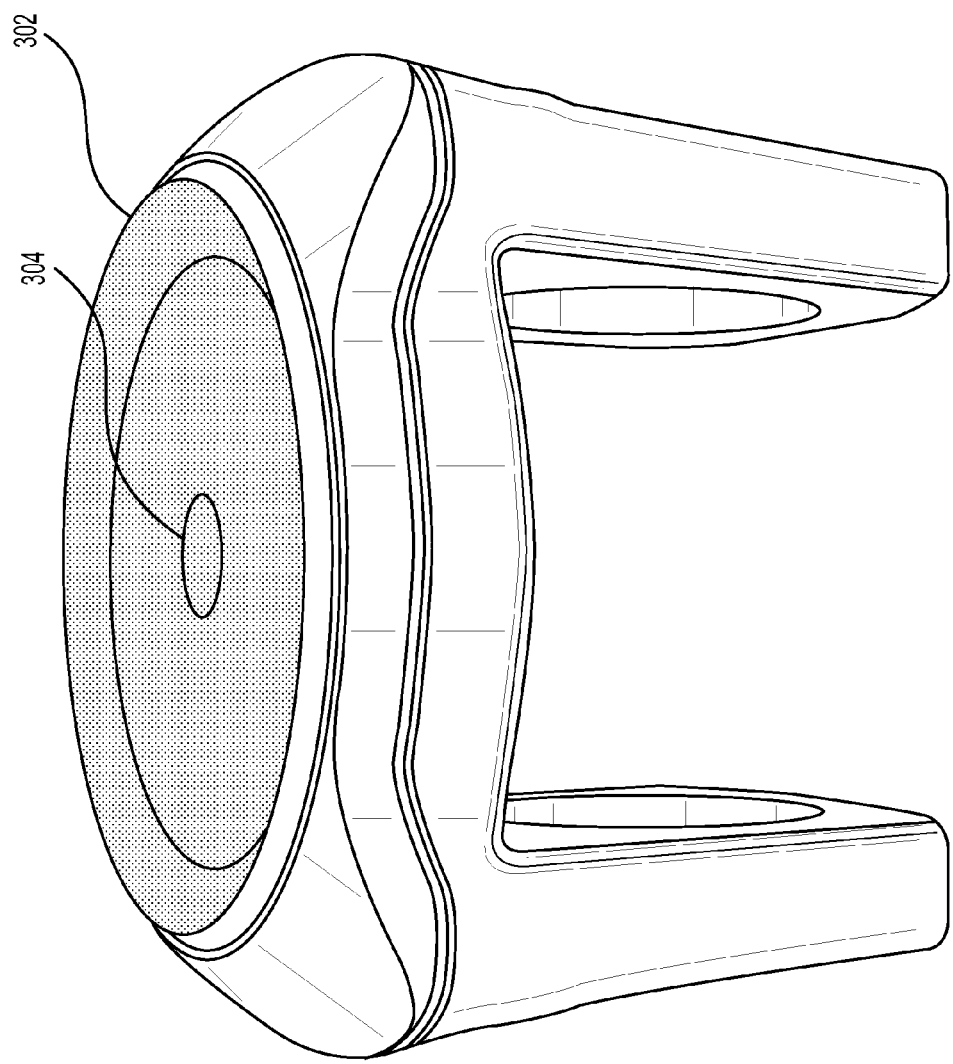
FIG. 3B is an exemplary illustration of the electronic device.

FIG. 3B is an exemplary illustration of the electronic device 102. Briefly speaking, the top portion (not numbered) of the electronic device 102 will contain a housing (not numbered), and the display 210 can emit light (via the halo-shaped display 302 and the circular display 304) that is visible through the housing.

The lower portion (not numbered) of the electronic device 102 is separable from the top portion, and comprises structures to install the electronic device 102 on the handlebar of a vehicle, such as a bicycle. As such, two opposing lower side of the electronic device 102 comprises a space to place the handlebar of the vehicle, to act as a support board. Once the lower portion of the electronic device 102 is attached to the handlebar, the top portion of the electronic device 102 is attached to the lower portion of the electronic device 102. In some non-limiting embodiments, the installation of the top portion of the electronic device 102 to the lower portion of the electronic device 102 may be done using specially designed screws further requiring a unique key to unlock and separate the top portion from the lower portion of the electronic device 102 to prevent a third-party from tampering with the electronic device 102.

Figure 4A:
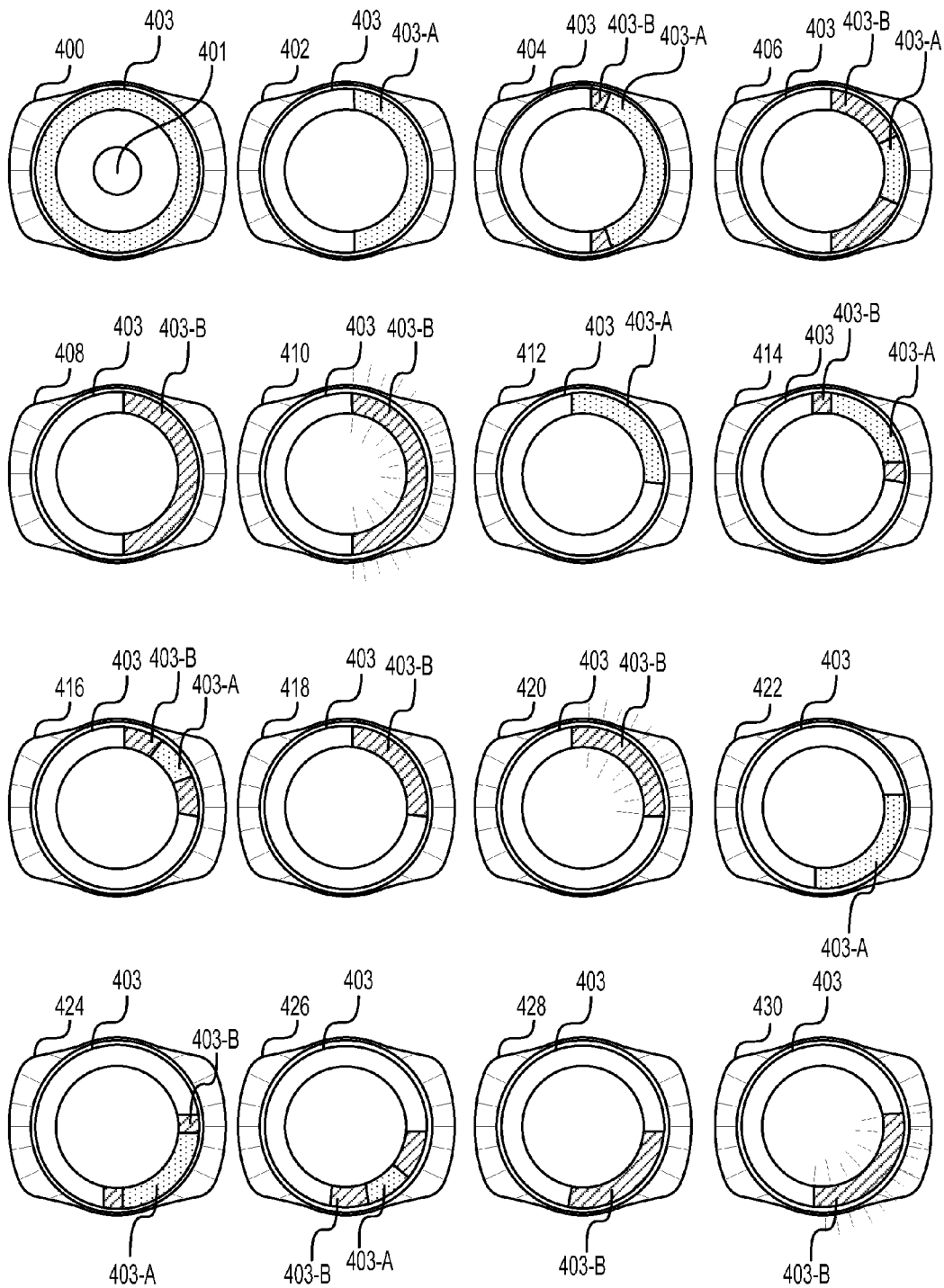
FIGS. 4A and 4B are exemplary circular visual signal indications suitable for display on the electronic device.
Figure 4B:
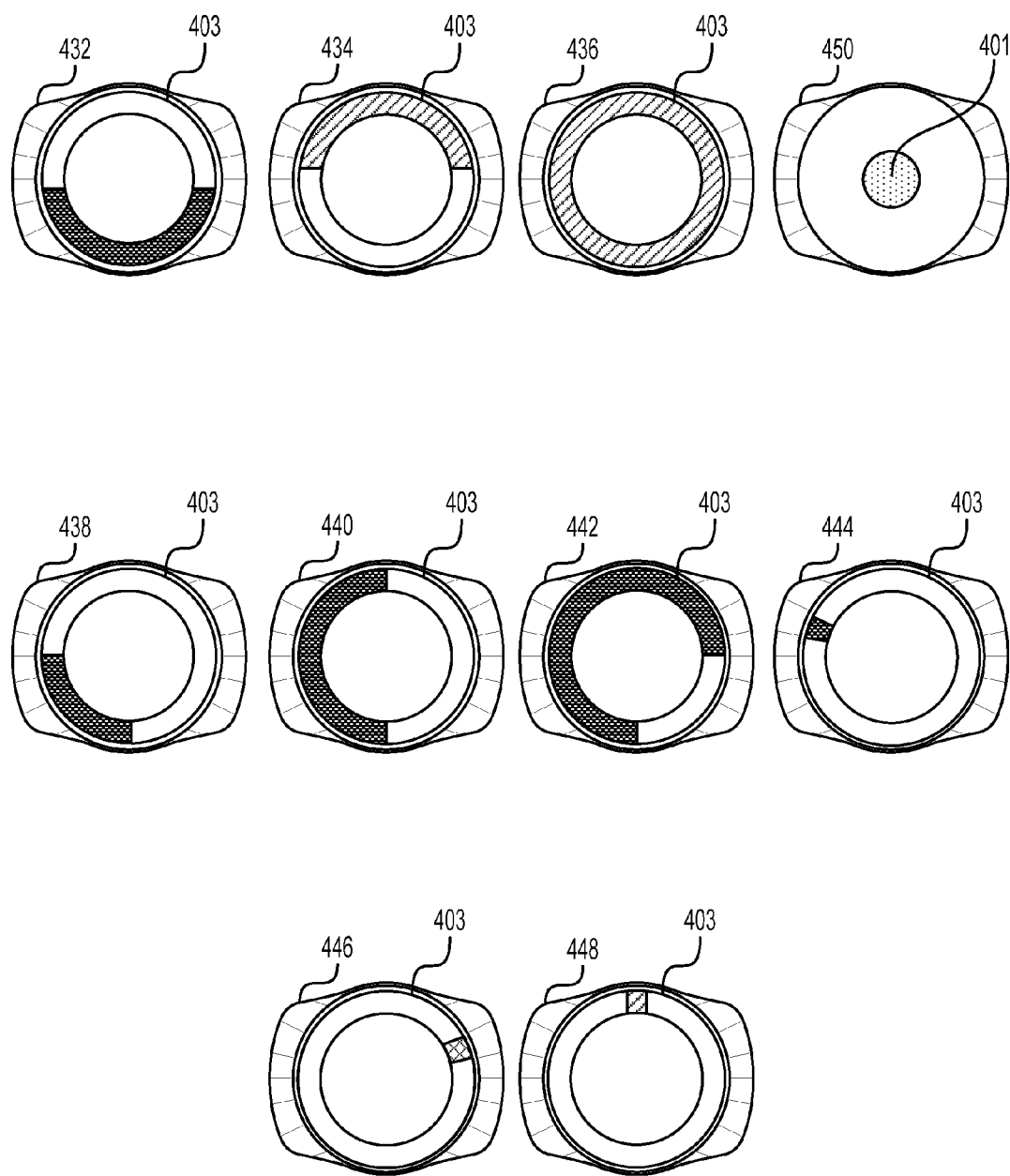

FIG. 4A and FIG. 4B are exemplary circular visual signal indications that may be displayed to the user by the display 210. It is to be expressly understood that the circular visual signal indications are exemplary, and alternative visual signals may be considered.

In the context of the present specification, unless provided expressly otherwise, a "circular visual signal indication" may refer to any visual indication display either in totality or in part of the display 210.

Block diagram 400 illustrates an exemplary circular visual signal indication indicating the user that the electronic device 102 is ready for use. In other words, the electronic device 102 is paired with the electronic device 104 and is ready to receive navigational data. As an example, the circular display 401 illuminates a first color, whereas the halo-shaped display 403 illuminates a second color.

Block diagrams 402 to 410 illustrate exemplary circular visual signal indications indicating a right turn, wherein each block diagram is associated with the location of the mobile device 104 with respect to the upcoming right turn.

At a first location, upon receiving circular visual signal indication of a right turn instruction at a predetermined distance, the right side portion of the halo-shaped display 403 is illuminated with a first colour 403-A as illustrated in block diagram 402. In some embodiments, the predetermined distance can be, but not limited to, 150 meters. In some embodiments, the first colour 403-A can be white.

In a subsequent location, as the current location of the mobile device 104 changes, the electronic device 102 receives a circular visual signal indication that causes a portion of the illuminated first colour 403-A to modify into a second color 403-B. For example, the block diagram 404 may indicate that the right turn is to be performed in, but not limited to 100 meters, whereas the block diagram 406 may indicate that the right turn is to be performed in, but not limited to, 50 meters. In some embodiments, the second colour 403-B can be green.

In yet a subsequent location, as the current location of the mobile device 104 changes, the electronic device 102 receives the circular visual signal indication that causes the totality of the portion of the illuminated first colour 403-A to be modified into the second color 403-B as illustrated by the block diagram 408, to indicate that the right turn is to be performed shortly.

In a last location, as the current location of the mobile device 104 changes, the electronic device 102 receives the circular visual signal indication that causes the portion of the illuminated second color 403-B to blink, as illustrated by the block diagram 410 to indicate that the user must perform the right turn.

Once the right turn is performed, the illumination of the halo-shaped display 403 is turned off (not depicted). In some embodiments, the electronic device 102 may receive a new circular visual signal indication for an upcoming navigational instruction.

Block diagrams 412 to 420 illustrates exemplary circular visual signal indications indicating a light right turn, wherein each block diagram is associated with the location of the mobile device 104 with respect to the upcoming light right turn.

At a first location, upon receiving circular visual signal indication of a light right turn instruction at a predetermined distance, the top right portion of the halo-shaped display 403 is illuminated with a first colour 403-A as illustrated in block diagram 412. In some embodiments, the predetermined distance can be, but not limited to 150 meters. In some embodiments, the first colour 403-A can be white.

In a subsequent location, as the current location of the mobile device 104 changes, the electronic device 102 receives a circular visual signal indication that causes a portion of the illuminated first colour 403-A to modify into a second colour 403-B. For example, the block diagram 414 may indicate that the light right turn is to be performed in, but not limited to 100 meters, whereas the block diagram 416 may indicate that the light right turn is to be performed in, but not limited to, 50 meters. In some embodiments, the second color 403-B can be green.

In yet a subsequent location, as the current location of the mobile device 104 changes, the electronic device 102 receives the circular visual signal indication that causes the totality of the portion of the illuminated first color 403-A to be modified into the second color 403-B, as illustrated by the block diagram 418, to indicate that the light right turn is to be performed shortly.

In a last location, as the current location of the mobile device 104 changes, the electronic device 102 receives the circular visual signal indication that causes the portion of the illuminated second color 403-B to blink as illustrated by the block diagram 420, to indicate that the user must perform the light right turn.

Once the light right turn is performed, the illumination of the halo-shaped display 403 is turned off (not depicted). In some embodiments, the electronic device 102 may receive a new circular visual signal indication for an upcoming navigational instruction.

Block diagrams 422 to 430 illustrates exemplary circular visual signal indications indicating a sharp right turn, wherein each block diagram is associated with the location of the mobile device 104 with respect to the upcoming sharp right turn.

At a first location, upon receiving circular visual signal indication of a sharp right turn instruction at a predetermined distance, the lower right portion of the halo-shaped display 403 is illuminated with a first colour 403-A as illustrated in block diagram 422. In some embodiments, the predetermined distance can be, but not limited to 150 meters. In some embodiments, the first colour 403-A can be white.

In a subsequent location, as the current location of the mobile device 104 changes, the electronic device 102 receives a circular visual signal indication that causes a portion of the illuminated first colour 403-A to modify into a second colour 403-B. For example, the block diagram 424 may indicate that the sharp right turn is to be performed in, but not limited to 100 meters, whereas the block diagram 426 may indicate that the sharp right turn is to be performed in, but not limited to, 50 meters. In some embodiments, the second color 403-B can be green.

In yet a subsequent location, as the current location of the mobile device 104 changes, the electronic device 102 receives the circular visual signal indication that causes the totality of the portion of the illuminated first color 403-A to be modified into the second color 403-B, as illustrated by the block diagram 428, to indicate that the sharp right turn is to be performed shortly.

In a last location, as the current location of the mobile device 104 changes, the electronic device 102 receives the circular visual signal indication that causes the portion of the illuminated second color 403-B to blink as illustrated by the block diagram 430, to indicate that the user must perform the sharp right turn now.

Although FIG. 4A depicts only the snapshots of various right turns (right turn, light right turn, sharp right turn) at specific locations of the electronic device 104, the modification of the first colour 403-A to the second color 403-B may be done in "real-time".

Moreover, the circular visual signal indications for the various left turns apply mutatis mutandis on the left half portion of the electronic device 104.

Turning now to FIG. 4B, the block diagram 432 illustrates an exemplary circular visual signal indication indicating the user to perform a U-turn wherein the lower half portion of the halo-shaped display 403 is illuminated. In some embodiments, the lower half portion of the halo-shaped display 403 may be blinking. In further embodiments, the said illumination is a red light.

The block diagram 432 illustrates an exemplary circular visual signal indication indicating the user to go straight, wherein the top half portion of the halo-shaped display 403 is illuminated. In some embodiments, the said illumination is a green light.

The block diagram 436 illustrates an exemplary circular visual signal indication indicating the user that he or she has arrived to the destination, wherein the totality of the halo-shaped display 403 is illuminated. In some embodiments, the said illumination is a green light.

The block diagram 450 illustrates an exemplary circular visual signal indication indicating a special event, wherein the circular display 401 is illuminated. In some embodiments, the special event can be indicative of that the user is currently receiving a call, or received a messaged on the mobile device 104. In another embodiment, the special event can be indicative of an off-route requirement, such as taking a ferry. In some embodiments, the illumination can be of different colors depending on the special event, and may or may not be accompanied with a blinking.

In a non-limiting embodiment, the above described circular visual signal indications indicative of navigational instructions are referred to as a first display type. In some embodiments, the user may interact with the user input module 206 to switch the first display type to a second display type.

For example, the block diagrams 438 to 442 illustrate an exemplary circular visual signal indication which may indicate (i) how the user is achieving an objective parameter he or she has previously inputted in the mobile application 108, or (ii) the distance travelled in terms of percentage with regards to the desired destination.

For example, if the user has set an objective of, for example, burning 100 Kcal and has achieved 25 Kcal (i.e. 25%), the halo-shaped display 403 will illuminate a corresponding portion of the halo-shaped display (illustrated by block diagram 438).

In another example, if the user has set an objective of, for example, riding a distance of 10 km and has achieved 5 km (i.e. 50%), the halo-shaped display 403 will illuminate a corresponding portion of the halo-shaped display (illustrated by block diagram 440)

In another example, if the user has travelled 75% of the route to the destination, the halo-shaped display 403 will illuminate a corresponding portion of the halo-shaped display (illustrated by block diagram 442).

Block diagrams 444 to 448 illustrate exemplary circular visual indications which indicate the cardinal direction of the destination (colloquially referred to as "As the crow flies" function). For the following examples, let it be assumed that the center top portion of the halo-shaped display 403 is directed toward the north.

In a first example, block diagram 444 illuminates the west-northwest portion of the halo-shaped display 403 with a first color 444-A, meaning that the destination is toward the west-northwest from the electronic device 102's location.

In a second example, block diagram 446 illuminates the east-northeast portion of the halo-shaped display 403 with a second color 446-A, meaning that the destination is toward the east-northeast from the electronic device 102's location.

In a third example, block diagram 448 illuminates the north portion of the halo-shaped display 403 with a third color 448-A, meaning that the destination is toward the north from the electronic device 102's location.

In some embodiments, the first color 444-A is red, the second color 446-A is yellow, and the third color 448-A is green, and each of these colors are indicative of the distance to the destination.

Although the illustrative examples of the "As the crow flies" function are depicted as separate from the first display type (i.e. Block diagrams 402 to 436), it is not limited as such, and the present technology may superimpose the "As the crow flies" function on the displaying of the circular visual signal indication associated with navigational instructions (i.e. first display type).

Again, it is to be expressly understood that the illustrations provided in FIGS. 4A and 4B are for exemplary purposes only, and are in no way intended to limit the scope of the present technology. Furthermore, the use of green, yellow, red lights is non-limitative and other colours or combinations thereof are also possible.

FIG. 5 illustrates a perspective view of the electronic device 102 assembled on a handlebar 500 of a bicycle.

In FIG. 5, the user is riding a bicycle on which the electronic device 102 is paired with the user's mobile device 104 (not depicted). In the depicted FIG. 5, the user of the vehicle is moving toward an intersection. The user has the choice of performing a left turn to go on the left street 502, keep straight on street 504, perform a light right turn to go on light right street 506 or perform a right turn to go on street 508.

In this particular example, the electronic device 102 has the right half portion of the halo-shaped display illuminated in green, indicating that the user must perform a right turn in a close distance, on the right street 508.

Figure 6:
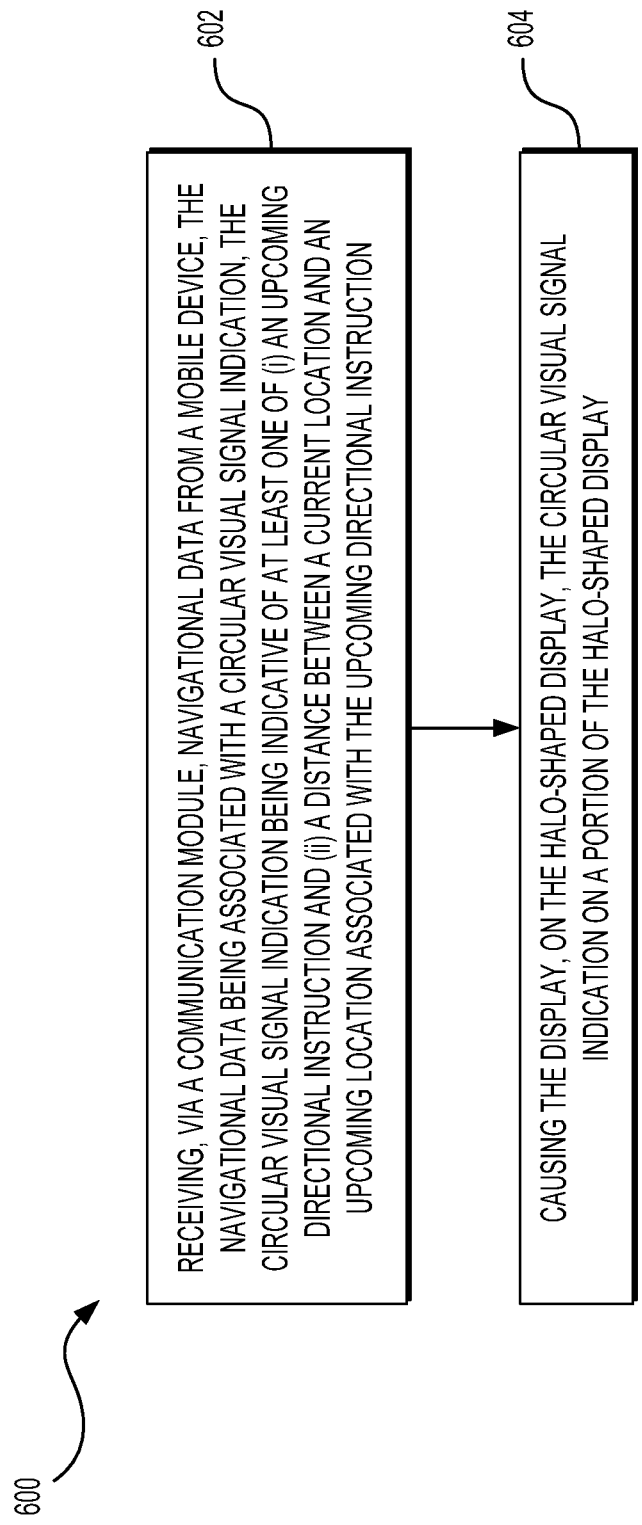
FIG. 6 is a flow chart of a method in an illustrative usage scenario for displaying navigational instructions.

FIG. 6 is a flow chart of a method 600 in an illustrative usage scenario for displaying navigational instructions, the method 600 being executable by the electronic device 102.

Step 602: receiving, via a communication module, navigational data from a mobile device, the navigational data being associated with a circular visual signal indication, the circular visual signal indication being indicative of at least one of (i) and upcoming directional instruction and (ii) a distance between a current location and an upcoming location associated with the upcoming directional instruction.

At step 602, the electronic device 102 receives navigational data associated with a circular visual signal indication from the mobile device 104. The circular visual signal indication is indicative of at least one of (i) an upcoming directional instruction and (ii) a distance between a current location an upcoming location associated with the upcoming directional instruction.

For example, the upcoming directional instruction can be one of the plurality of available directional instruction, such as turn instructions, go-straight instructions, arrive-at-destination instructions, off-route instructions, and the like. Moreover, the electronic device 102 may also receive navigational data indicative of the distance between each navigational instruction.

Step 604: causing the display, on the halo-shaped display, the circular visual signal indication on a portion of the halo-shaped display.

In step 604, the electronic device 102 causes the displaying of the circular visual signal indication on the halo-shaped display 302. The display distinguishes the navigation instructions from other available navigation instructions and can prompt the user of the electronic device 102 to take appropriate actions (e.g. turn right, turn left, go straight, U-turn, etc.).

Figure 7:
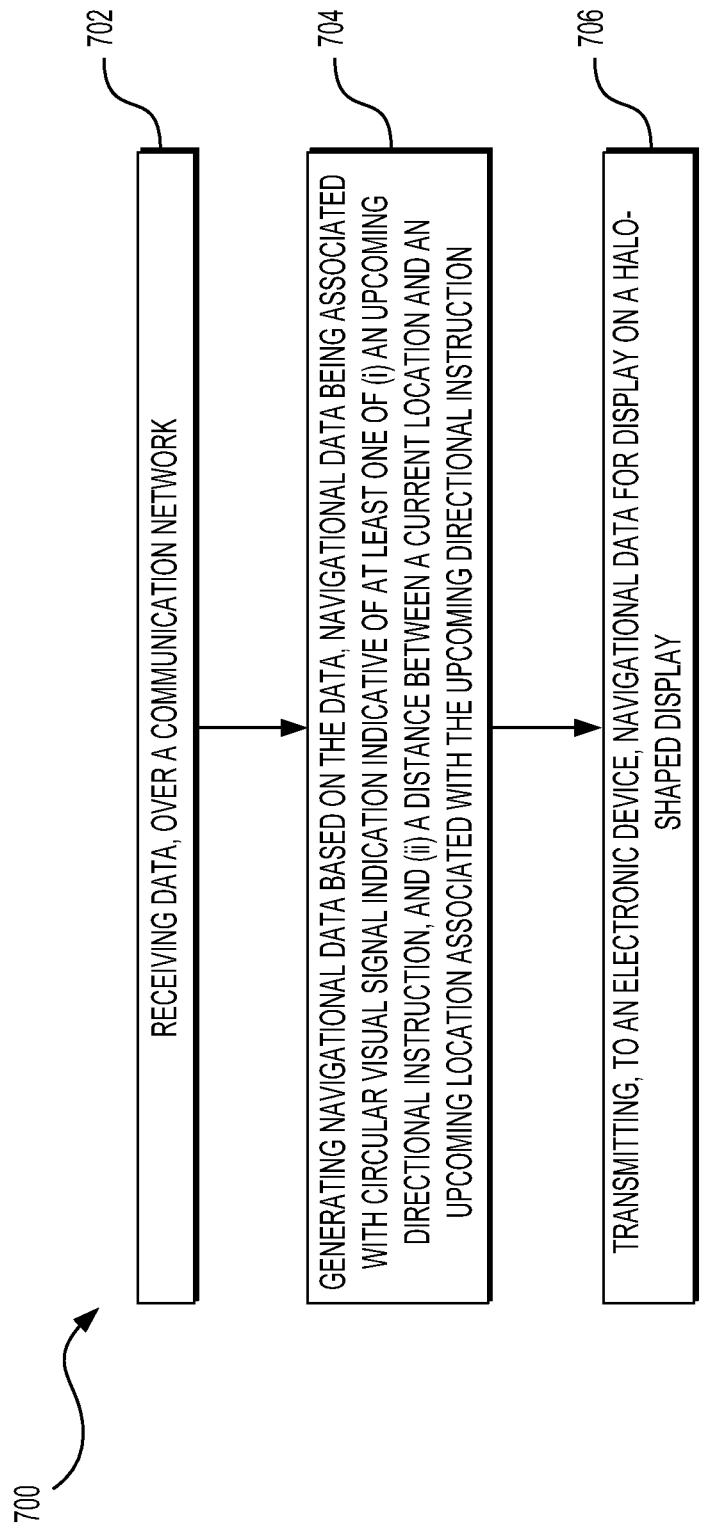
FIG. 7 is a flow chart of a method in an illustrative usage scenario for a mobile device.

FIG. 7 is a flow chart of a method 700 in an illustrative usage scenario for the mobile device 104.

Step 702: receiving data, over a communication network.

At step 702, the mobile device 104 receives data over the communication network 110.

Step 704: generating navigational data based on the data, navigational data being associated with circular visual signal indication indicative of at least one of (i) an upcoming directional instruction, and (ii) a distance between a current location and an upcoming location associated with the upcoming directional instruction; and At step 704, the mobile device 104 generates navigational data based on the data received over the communication network 110. The generated navigational data is associated with circular visual signal indication indicative of at least one of (i) an upcoming directional instruction, and (ii) a distance between a current location and an upcoming location associated with the upcoming directional instruction.

Step 706: transmitting, to an electronic device, navigational data for display on a halo-shaped display.

At step 706, the mobile device 104 transmits navigational data to the electronic device 102. The transmitted navigational data is used to cause the electronic device 102 to display a corresponding circular visual signal indication on an halo-shaped display 302.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An electronic device, the electronic device being adapted to be installed on a handlebar of a vehicle, the electronic device comprising:
   a processor;
   a communication module;
   a display comprising a halo-shaped display;
   a memory for storing therein executable instructions, the instructions upon being processed by the processor, causing the electronic device to:
      i. receive, via the communication module, navigational data from a mobile device, the navigational data being associated with a circular visual signal indication, the circular visual signal indication being indicative of at least one of (i) an upcoming directional instruction and (ii) a distance between a current location and an upcoming location associated with the upcoming directional instruction; and
      ii. cause to display, on the halo-shaped display, the circular visual signal indication.

2. The electronic device of claim 1, wherein the navigational data is being associated with the circular visual signal indication on the mobile device using a correspondence table implemented in the mobile device.

3. The electronic device of claim 1, wherein the navigational data is being associated with the circular visual signal indication on the electronic device using a correspondence table implemented in the electronic device.

4. The electronic device of claim 1, wherein the display comprises a plurality of LEDs arranged in a circular fashion.

5. The electronic device of claim 4, wherein causing to display, on the halo-shaped display, the circular visual signal indication comprises determining which LED amongst the plurality of LEDs is to be illuminated to define the circular visual signal indication.

6. The electronic device of claim 1, wherein the circular visual signal indication comprises at least one of a sharp right-turn display, a light right-turn display, a right-turn display, a sharp left-turn display, a light left-turn display, a left-turn display, a keep-straight display, a U-turn display, and an arrive-at-destination display.

7. The electronic device of claim 1, wherein the electronic device further comprises a circular display.

8. The electronic device of claim 7, wherein the circular visual signal indication comprises a special event display.

9. The electronic device of claim 1, wherein causing to display, on the halo-shaped display, the circular visual signal indication comprises illuminating a first circular portion of the display with a first color and illuminating a second portion of the display with a second color.

10. The electronic device of claim 9, wherein upon determining that the current location of the mobile device has changed, modifying at least a portion of the first circular portion so as to replace the first color with the second color.

11. The electronic device of claim 9, wherein, upon determining that the current location of the mobile device has changed, modifying the first circular portion from the first color so as to replace the first color with the second color.

12. The electronic device of claim 9, wherein, upon determining that the current location of the mobile device has changed, causing the second portion to define a second circular portion and a third circular portion, the first circular portion being located between the second circular portion and the third circular portion.

13. The electronic device of claim 12, wherein, upon determining that the current location of the mobile device has changed, causing the first circular portion to be reduced and causing the second and third circular portions to be expanded.

14. The electronic device of claim 9, wherein, upon determining that the current location of the mobile device has changed, causing at least one of the first circular portion and the second portion to flash.

15. The electronic device of claim 1, wherein the navigational data comprises a first byte associated with general instruction and a second byte associated with a parameter of the general instruction.

16. A method of displaying navigational instructions, the method being executable by an electronic device, the electronic device being adapted to be installed on a handlebar of a vehicle and comprising a display, the display comprising a halo-shaped display, the method comprising:

receiving, via a communication module, navigational data from a mobile device, the navigational data being associated with a circular visual signal indication, the circular visual signal indication being indicative of at least one of (i) an upcoming directional instruction and (ii) a distance between a current location and an upcoming location associated with the upcoming directional instruction; and causing to display, on the halo-shaped display, the circular visual signal indication.

17. The method of claim 16, wherein the navigational data is being associated with the circular visual signal indication on the mobile device using a correspondence table implemented in the mobile device.

18. The method of claim 16, wherein the navigational data is being associated with the circular visual signal indication on the electronic device using a correspondence table implemented in the electronic device.

19. The method of claim 16, wherein causing to display, on the halo-shaped display, the circular visual signal indication comprises determining which LED amongst a plurality of LEDs is to be illuminated to define the circular visual signal indication.

20. The method of claim 16, wherein the circular visual signal indication comprises at least one of a sharp right-turn display, a light right-turn display, a right-turn display, a sharp left-turn display, a light left-turn display, a left-turn display, a keep-straight display, a U-turn display, and an arrive-at-destination display.

21. The method of claim 16, wherein causing to display, on the halo-shaped display, the circular visual signal indication comprises illuminating a first circular portion of the display with a first color and illuminating a second portion of the display with a second color.

22. The method of claim 21, wherein upon determining that the current location of the mobile device has changed, modifying at least a portion of the first circular portion so as to replace the first color with the second color.

23. The electronic device of claim 21, wherein, upon determining that the current location of the mobile device has changed, modifying the first circular portion so as to replace the first color with the second color.

24. The method of claim 21, wherein, upon determining that the current location of the mobile device has changed, causing the second portion to define a second circular portion and a third circular portion, the first circular portion being located between the second circular portion and the third circular portion.

25. The method of claim 24, wherein, upon determining that the current location of the mobile device has changed, causing the first circular portion to be reduced and causing the second and third circular portions to be expanded.

26. The method of claim 21, wherein, upon determining that the current location of the mobile device has changed, causing at least one of the first circular portion and the second portion to flash.

27. The method of claim 16, wherein the navigational data comprises a first byte associated with general instruction and a second byte associated with a parameter of the general instruction.

* * * * *